Oct. 6, 1970   N. H. KLEIN ET AL   3,532,381
SAFETY DEVICE

Filed July 3, 1968   3 Sheets-Sheet 1

INVENTOR.
NORBERT H. KLEIN
THERESA H. KLEIN

INVENTOR.
NORBERT H. KLEIN
THERESA H. KLEIN

United States Patent Office 3,532,381
Patented Oct. 6, 1970

3,532,381
SAFETY DEVICE
Norbert H. Klein and Theresa H. Klein, both of
R.F.D. 2, Box 160, Thorofare, N.J. 08086
Filed July 3, 1968, Ser. No. 742,236
Int. Cl. A62b 35/00; B60r 21/10
U.S. Cl. 297—388  11 Claims

ABSTRACT OF THE DISCLOSURE

A safety device for maintaining a seat occupant in place during movement of a vehicle and comprising a safety harness which is anchored to the frame of a head rest. The safety device also includes a novel shock-absorbing mechanism which permits limited movement of the occupant and cushions the occupant in the event of any sudden deceleration of the vehicle.

BACKGROUND OF THE INVENTION

The present invention relates to safety devices, and more particularly, to a safety device for a seat occupant in a vehicle. The invention is applicable to road vehicles as well as air and marine craft.

A conventional seat, or lap, belt which passes around the waist normally prevents a seat occupant from being thrown from a vehicle in the event of a crash. However, even if the occupant is wearing a lap belt, considerable movement of the upper torso and head can still occur which results in injuries to these body portions. Movement of the upper torso can be controlled by the use of a harness of the type which passes over shoulders of the occupant. Head and neck injuries can be greatly reduced by the use of a head rest.

One of the main problems in the use of the above-described safety devices is that the vehicle owner, in order to obtain maximum protection, must install separately, and use separately, three different devices, namely: a lap belt, a shoulder harness, and a head rest. Further, in shoulder harnesses known heretofore, a problem has existed in providing a solid, economical, and esthetically pleasing anchorage system for the harness straps. The harness straps are normally fixed to the vehicle side posts, or to the ceiling of the vehicle. This arrangement is not only cumbersome, but is not adaptable to open vehicles, such as automobiles of the convertible type.

An attempt has been made to overcome some of the disadvantages of prior-art shoulder harnesses by installing shoulder straps in specially constructed seats. This arrangement is generally too expensive and complicated for mass-produced vehicles, and this type of device must be installed during construction of the vehicle. It has also been found that straps which pass up and over an occupant's shoulders tend to bind on his clothing and are uncomfortable to wear.

Conventional shoulder harnesses include a take-up device which permits limited movement of the seat occupant during normal operation of the vehicle. The take-up device may include a locking means, e.g. an inertia-operated mechanism, which is activated when a predetermined acceleration force is encountered. One disadvantage with the inertia-operated mechanisms is that they often lock the occupant in an extreme rearward position. If this happens during an emergency in the case of a pilot, for example, the pilot may be prevented from reaching controls necessary to correct a dangerous situation.

SUMMARY OF THE INVENTION

The device of this invention is adapted to be installed directly over a vehicle seat and comprises a head rest and an anchorage system for a shoulder harness. The harness straps are connected to a strap tensioning means located in the interior of the head rest.

In one embodiment of the invention, the shoulder straps are connected to a pair of drums coaxially mounted on a single shaft and adapted to rotate through a part of a revolution. The straps are partially coiled on the drums, and as the straps are tensioned by the seat occupant, the drums rotate within limits to extend or retract the straps. Constant tension springs located in the drums bias the drums in a strap-retracted direction and thus maintain a slight tension in the straps when the harness is installed on the seat occupant. A bumper, or stop, carried on each drum prevents rotation of the drum past a given point. Shock absorbing material is carried on the face of the bumper so that if sudden deceleration occurs, due to a crash or the like, the occupant will be cushioned against the shock.

In a second embodiment, the strap tensioning means comprises a longitudinally movable piston operatively connected to the shoulder straps and movable in a cylindrical housing adapted to be fixed to the vehicle. Constant tension springs resist movement of the piston from a fully retracted position to a certain point. Movement of the piston past this point is strongly resisted by shock absorbing material which is compressed between the piston and an end wall of the cylinder.

A principal object of this invention is to provide a safety device for a seat occupant in a vehicle and which is adapted to perform the functions of a lap belt, shoulder harness, and a head rest.

Another object of this invention is to provide a safety device for a seat occupant in a vehicle in which a shoulder harness is anchored to a head rest.

Another object of this invention is to provide a simple, reliable, and economical anchorage system for a shoulder harness in a vehicle.

Another object of this invention is to provide a strap tensioning means for a shoulder harness in which limited movement of the seat occupant is permitted under all operating conditions.

A further object of this invention is to provide a shoulder harness with shock absorbing means.

A still further object of this invention is to provide a safety device for a seat occupant in a vehicle which is adapted to be used on all models and types of vehicles.

Other objects of the invention will be apparent hereinafter from the specification and appended claims.

BRIEF DESCRIPTION OF THE DRAWINGS

FIGS. 8–10 are diagrammatic views of a second embodiment of the strap tensioning means, in which FIG. 8 shows a seat occupant in a normal operating position in which movement is being restricted by the constant tension springs.

FIG. 9 shows the normal occupant position in dotted lines and the maximum free movement position in solid lines, in which the piston is abutting the shock absorbing material.

FIG. 10 shows the normal occupant position in dotted lines and an impact position in solid lines, with the shock-absorbing material being shown in a compressed condition.

DESCRIPTION OF THE PREFERRED EMBODIMENT

Figure 1:
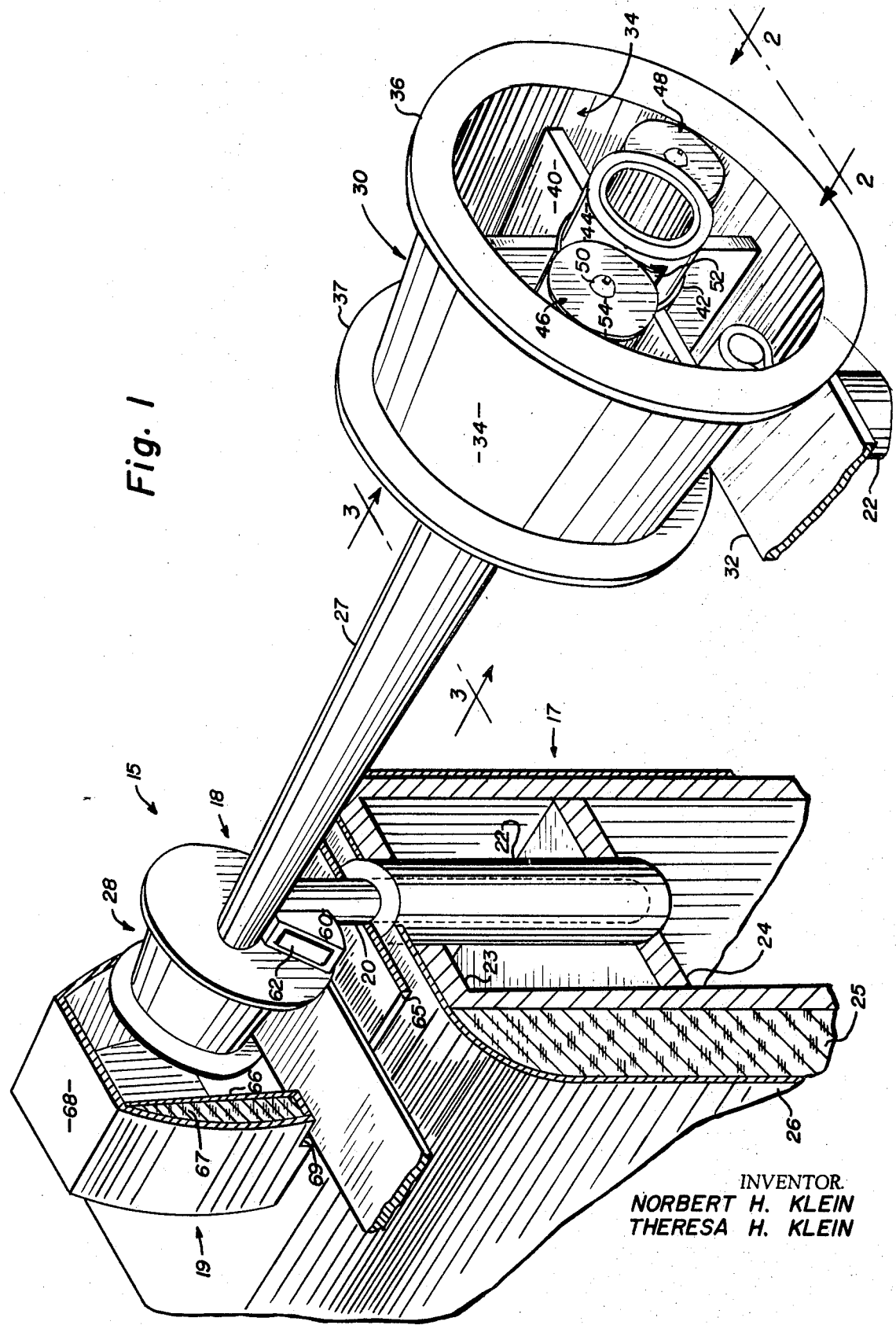
FIG. 1 is a fragmentary perspective view of the safety device of this invention mounted on a vehicle seat, with the seat and head rest broken away to show the strap tensioning means and mounting structure of the safety device.
Figure 6:
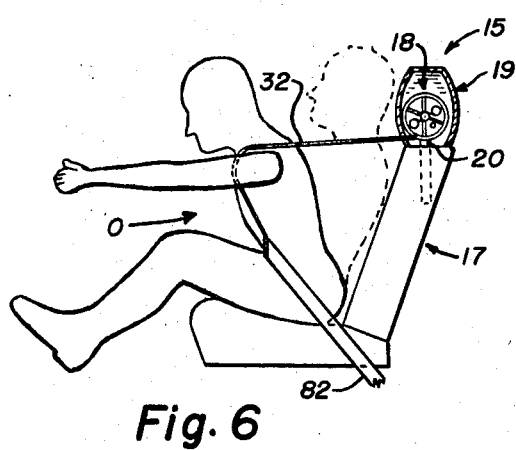
FIG. 6 is a diagrammatic view of a seat occupant in the forwardmost position (solid lines), and in the normal seating position (dotted lines).
Figure 7:
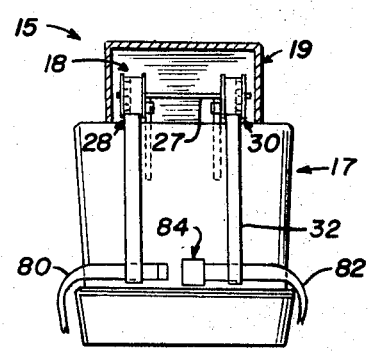
FIG. 7 is a front view of a seat equipped with the safety device of this invention, with the head rest broken away to show the shoulder strap take-up elements.

Referring now to the drawings by numerals of reference, and particularly to FIGS. 1, 6, and 7, the safety device of this invention is designated 15 and is shown as mounted on a vehicle seat 17. Safety device 15 comprises a strap tensioning mechanism 18 which is substantially enclosed within a head rest 19.

Safety device 15 is fixed to seat 17 by means of a pair of vertically extending posts 20. Posts 20 are carried in cylinders 22 which are fixed to seat frame members 23 and 24. Posts 20 are preferably fixed to cylinders 22 by means of fasteners, not shown, and posts 20 may be removably mounted to the cylinders, if desired. Seat frame member 23 is rigidly fixed to the vehicle frame and is adapted to withstand shock forces which may be generated as a result of an accident. Padding 25 is placed over the forward side of frame member 23, and covering material 26 extends over the padding, as shown in FIG. 1.

Strap tensioning mechanism 18 comprises a cross bar 27 which extends between, and is joined to, posts 20, by welding or other means. A first drum 28 is rotatably mounted on one axial end of bar 27, and a second drum 30 is mounted at the opposite axial end. Inasmuch as drums 28 and 30 are of substantially the same structure, only drum 30 will be described in detail, it being understood that drum 28 is constructed in the same manner.

Drum 30 is adapted to rotate on bar 27 through approximately 300 degrees for the purpose of extending and retracting a harness strap 32 adapted to be wound about drum 30 (see FIG. 6). Strap 32 is carried on a cylindrical section 34 of the drum and is maintained in axial alignment by an upstanding flange 36 on one end of section 34 and by an outer peripheral edge of a disk 37 at the other end of section 34. Strap 32 is anchored to the drum by a pin connection shown at 38. Radial members 40 connect outer cylindrical section 34 of the drum with a hub 42 which is journalled on bar 27. A sleeve 44 on the end of bar 27 prevents drum 30 from moving axially off of the bar 27.

Figure 2:
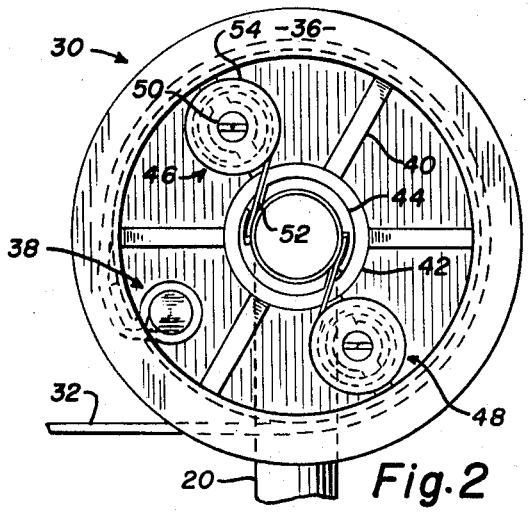
FIG. 2 is an end view of the shoulder strap take-up drum, as seen from the position 2—2 of FIG. 1, with the take-up drum in the retracted position.
Figure 3:
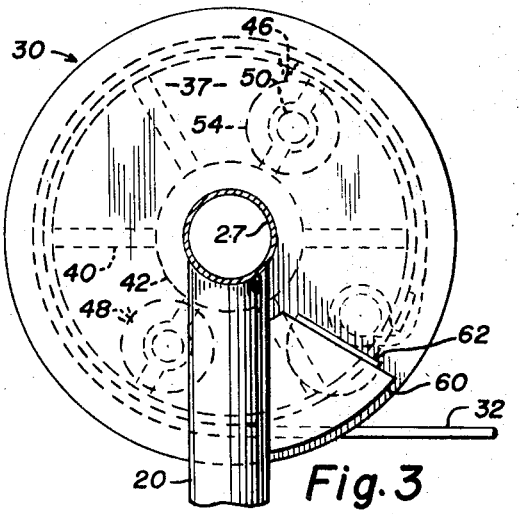
FIG. 3 is a sectional view taken on the line 3—3 of FIG. 1 (drum in retracted position).
Figure 4:
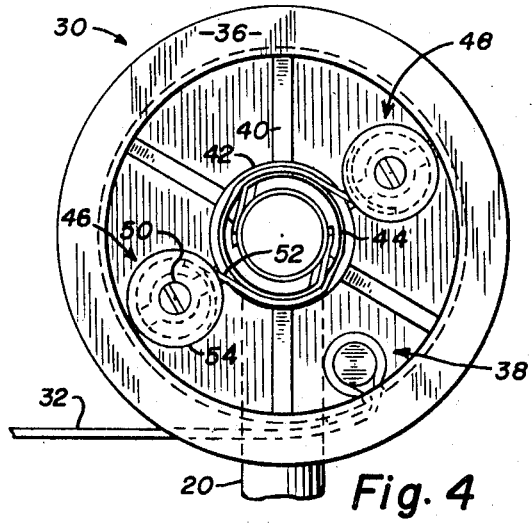
FIGS. 4 and 5 shows the same structural elements as FIGS. 2 and 3 respectively, but with the shoulder strap take-up drum advanced approximately 280 degrees (out of a potential 300 degrees) from the position shown in FIGS. 2 and 3.
Figure 5:
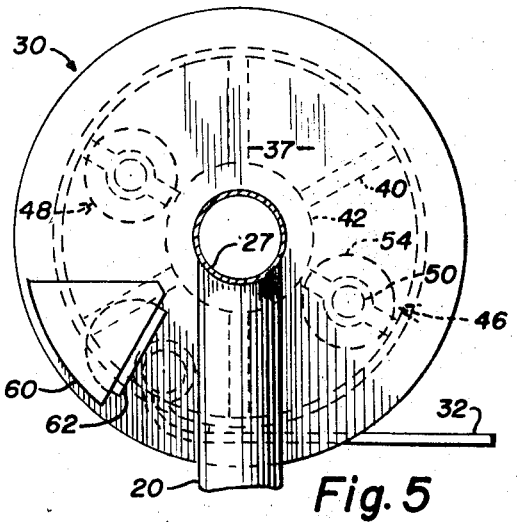

Rotative movement of drum 30 in a clockwise direction, as shown in FIG. 1, is resisted by a pair of spring elements 46 and 48. Each of the spring elements is connected to radial member 40 by a screw 50. Steel strip material 52 is fastened at one end to a cylinder 54 and at the other end to sleeve 44. The strip material 52 unwinds from cylinder 54 and winds about sleeve 44, as drum 30 is rotated clockwise from a strap-retracted position (FIG. 2) to a strap-extended position (FIG. 4). Since the strip material is in its natural position when coiled about cylinder 54, it resists unwinding, and thus resists rotation of the drum 30. Spring elements 46 and 48 are preferably of the constant tension type; however other spring types may be used.

A bumper, or stop, 60 is mounted on disk 37 for maintaining drum 30 in an at-rest position and for preventing rotation of the drum past 300 degrees. Energy absorbing material 62 is carried on one surface of the bumper 60. When strap 32 is in a fully extended position, the shock absorbing material will be in contact with post 20. Energy absorbing material 62 may be a resilient material, such as sponge or foam rubber. The resilient material would be preferred for vehicles in which the wearer is frequently subjected to relatively high "G" shock loads during operation of the vehicle, e.g. in light aircraft. For applications in which the wearer is subjected to very slight loads, except under emergency conditions, the shock absorbing material may be a crushable material which is hard and strong enough to offer considerable resistance under emergency conditions, but which will break or collapse when enough force is applied. Thus, the material would crush under crash conditions, but not so easily that it would not gradually decelerate the seat occupant. For this purpose, a material such as cellular cellulose acetate can be used. In the event it is necessary to replace material 62 on bumper 60, a new piece of the material would be cemented on the face of the bumper.

Head rest 19, as best shown in FIGS. 1 and 7, comprises a rigid frame having a base plate 65 connected to posts 20, as by welding, and an upright frame member 66. Padding 67, on the front surface of frame member 66, is covered by sheet material 68. Straps 32 pass through openings 69 in the front face of the head rest.

As shown in FIGS. 6 and 7, straps 32 are affixed to belt portions 80 and 82 of a lap belt of known construction. Each of the belt portions is adapted to be anchored to the vehicle frame in a well known manner. As shown in FIG. 6, the seat occupant installs the safety device by first putting his arms through straps 32, and then joining belt portions 80 and 82 by means of a buckle 84. The normal and forward positions of the seat occupant are shown in FIG. 6.

It will be apparent to those skilled in the art that a single shoulder strap extending diagonally across the seat occupant could be used in lieu of the above-described arrangement, without departing from the spirit of the invention. Further, if two straps are used, they could be wound on a single compound drum. It will also be seen that the shock absorbing material could be mounted on post 20, instead of the bumper.

A second embodiment of the strap tensioning mechanism is shown at 98 in FIGS. 8–11. Tensioning device 98 is particularly adapted for use with vehicles which have usable space behind the operator's seat.

Figure 10:
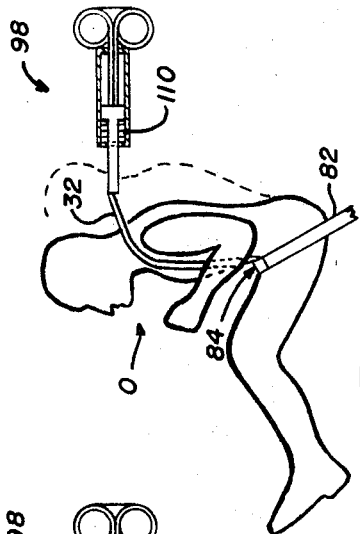
Figure 9:
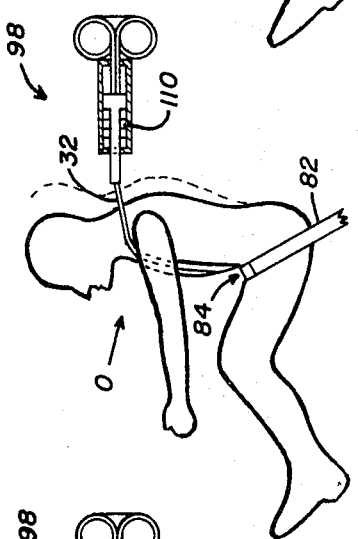
Figure 8:
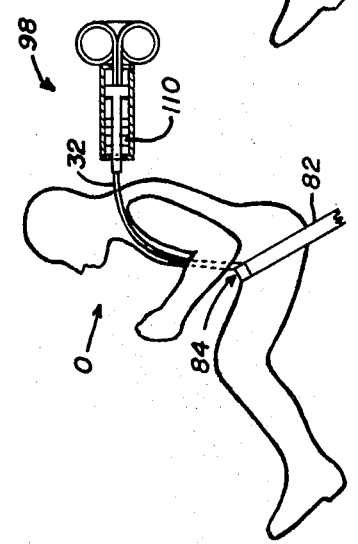
Figure 11:
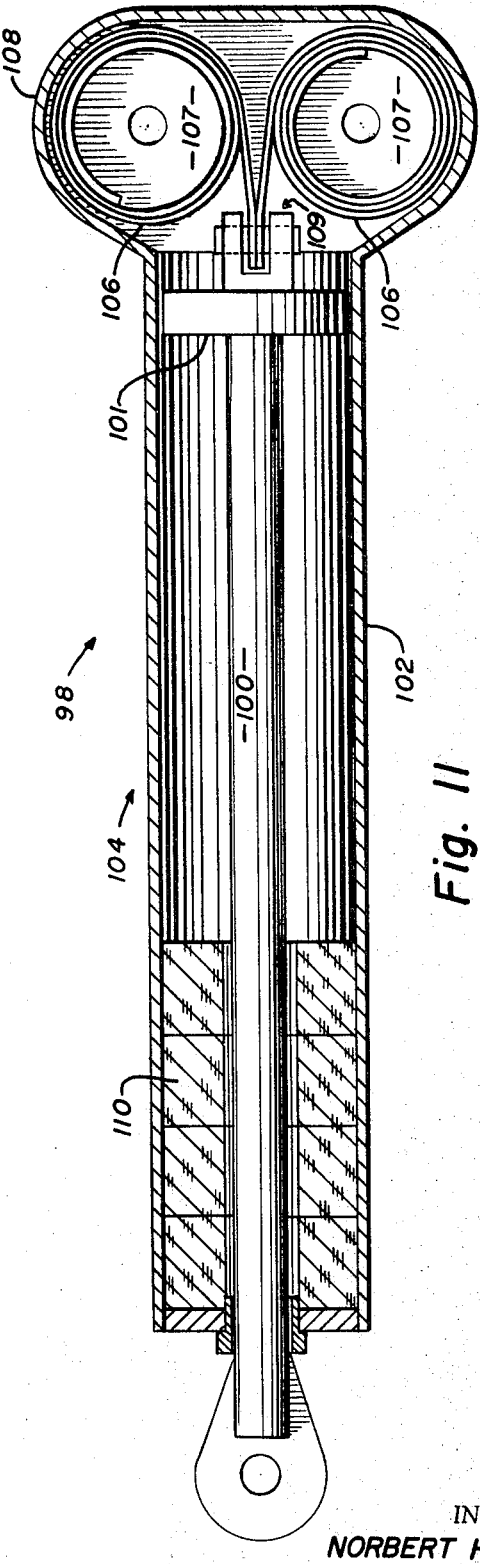
FIG. 11 is a longitudinal sectional view of the second embodiment of the strap tensioning means.

As shown in FIGS. 8–10, shoulder straps 32 are both fixed at their upper ends to a piston rod 100 connected to a piston 101 which is slidably mounted in a cylindrical portion 102 of a housing 104. Springs 106 are mounted on cylinders 107 in end portion 108 of the housing and are connected to piston 101 at 109. As described in the first embodiment, springs 106 are preferably of the constant tension type. Shock absorbing material in the form of disks 110 is located at one end of cylindrical portion 102 and is adapted to abut piston 101.

Both straps 32 are described above as being attached to a single device 98. It will be apparent, however, that a separate device 98 could be used for each strap, if desired. Further, devices 98 could be incorporated in a head rest, or mounted to, or behind, a wall portion in a vehicle.

A seat occupant wears the disclosed safety devices 15 by first placing the arms through straps 32, as shown in FIG. 6, and then fastening buckle 84. In normal operation of the vehicle, the occupant will move between the dotted-line position (FIGS. 6 and 9) and the solid-line position. In the event of sudden deceleration of the vehicle, the occupant will move slightly forward from the solid-line position, as a result of compression of the energy absorbing material. However, the occupant will be held in this position and prevented from being thrown against parts of the vehicle. The head rest protects the occupant from injuries resulting from rear-end collisions.

Movements of the seat occupant, when tensioning mechanism 98 is used, are shown in FIGS. 8–10. The normal range of occupant movement is shown as being between the dotted-line and solid-line positions in FIG. 9. An impact position is shown in solid lines in FIG. 10.

From the foregoing description, it will be seen that a simple, efficient, and reliable safety device is disclosed. By simply closing one fastener, or buckle, the wearer has the protection of a lap belt, a shoulder harness, and a head rest. Moreover, the disclosed shoulder harness anchorage system eliminates the need to anchor the harness straps to the vehicle side posts or to the ceiling. It will be seen that the head rest shoulder harness may be removed and installed in a single unit and thus can be adapted to many different types of vehicles.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the limits of the appended claims.

What is claimed is:

1. A safety device for use by a seat occupant, said device comprising:
    a head rest having an elongated body and a rigid frame means, said body having a front portion which is padded, said head rest being adapted to be mounted directly over a seat with said padded portion adjacent the head of said occupant;
    mounting means operatively connected to said frame means for supporting said head rest over said seat; and
    strap means operatively connected to said rigid frame means and adapted to extend over the shoulders of said seat occupant.

2. A safety device, as recited in claim 1, wherein a tensioning means is connected between said strap means and said frame means.

3. A safety device, as recited in claim 2, wherein said tensioning means comprises a second frame means fixed to said rigid frame means, drum means is rotatably carried on said second frame means, and said strap means is fixed to and at least partially carried on said drum means.

4. A safety device, as recited in claim 3, wherein spring means is connected between said drum means and said second frame means, and said spring means resists rotation of said drum means.

5. A safety device, as recited in claim 4, wherein said tensioning means comprises bumper means on said drum means, and said bumper means comprises shock absorbing means which is adapted to abut against said second frame means after said drum means has turned through a predetermined arc.

6. A safety device, as recited in claim 5, wherein said drum means comprises a pair of drums rotatably mounted on said second frame means, and said strap means comprises a pair of straps having upper ends fixed to said drums and lower ends connected to a lap belt.

7. A tensioning device for use with a shoulder harness, said device comprising:
    a first body member;
    a second member carried by said first body member and adapted to move relative thereto, said second member being adapted to be connected to at least one tension member;
    spring means connected to said second member for retarding movement thereof; and
    shock absorbing means adapted to arrest the movement of said second member after a given amount of travel, and said shock absorbing means including deformable means which is adapted to absorb shock loads.

8. A tensioning device, as recited in claim 7, wherein said first body member is a cylinder, said second member comprises a piston reciprocal in said cylinder and operatively connected to said tension member, said spring means are operatively connected to said piston at one axial side thereof, and said shock absorbing means is carried in said cylinder and adapted to abut an opposite side of said piston after it has traveled said given amount.

9. A tensioning device, as recited in claim 7, wherein said second member is a drum rotatably mounted on said first member, said spring means is connected between said drum and said first member to resist rotation of the drum, said tension member is adapted to be wound on said drum, and said shock absorbing means is carried on said drum and adapted to abut against said first body member after said drum has turned through a predetermined arc.

10. A tensioning device, as recited in claim 7, wherein said spring means comprises a constant tension spring.

11. A safety device, as recited in claim 1, wherein said mounting means includes an elongated element which extends from a bottom portion of said body and is adapted to be received in frame structure of said seat.

References Cited

UNITED STATES PATENTS

| | | | |
|---|---|---|---|
| 443,681 | 12/1890 | Kenny | 242—107.4 |
| 2,557,313 | 3/1963 | Kent. | |
| 3,330,599 | 7/1967 | Inoue | 297—388 |
| 3,386,682 | 6/1968 | Bajek | 242—107 |
| 3,439,932 | 4/1969 | Lewis et al. | 297—388 X |
| 3,442,529 | 5/1969 | Lewis et al. | 297—388 X |

CASMIR A. NUNBERG, Primary Examiner

U.S. Cl. X.R.

188—1; 280—150; 279—389